Jan. 18, 1938. P. SIMONDS 2,105,824
SECTIONAL DRIVE
Filed July 2, 1936 2 Sheets-Sheet 2

INVENTOR
PAUL SIMONDS
BY
ATTORNEY

Patented Jan. 18, 1938

2,105,824

UNITED STATES PATENT OFFICE 2,105,824

SECTIONAL DRIVE

Paul Simonds, Milwaukee, Wis., assignor to The Oilgear Company, Milwaukee, Wis., a corporation of Wisconsin Application July 2, 1936, Serial No. 88,524

14 Claims. (Cl. 271—2.3)

This invention relates to driving mechanisms for the several sections or units of a single machine, such as a paper mill or a printing press, or for a group of related machines the speeds of which should be maintained proportional to each other.

In machines which operate upon substantially continuous webs of material, it is essential that the speeds of the several machines or machine units be maintained proportional to each other and that the speed of any machine or unit be varied either manually or automatically to compensate for stretching or shrinking of the material.

The invention has as an object to provide a drive of this character which will maintain the speed of the several machines or machine units driven thereby proportional to each other regardless of variations in the loads thereon.

Another object is to provide a plurality of machines or machine units with a drive having means for varying the speed of all of the machines or machine units by making a single adjustment and without varying the speed of the prime mover from which the drive is driven.

A drive constructed according to the invention has the advantage that the several sections of the drive may be driven either from a single prime mover or each section of the drive may be driven by separate prime movers the individual speeds of which may vary without affecting the relative speeds of the several machines or machine units driven by the drive.

According to the invention in its general aspect, the drive includes as many hydraulic transmissions as there are machines or machine units to be driven, a small control pump driven in unison with the hydraulic motor of each transmission, the control pumps being connected in series, and means whereby any difference between the volumetric output of one control pump and the volumetric input of the next control pump in the series will cause the relative displacements of the pump and motor of one of the transmissions with which those control pumps are associated to be varied until said output and input are equal.

The invention is exemplified by the hydraulic drives shown schematically in the accompanying drawings in which the views are as follows.

Fig. 1

Figure 1:
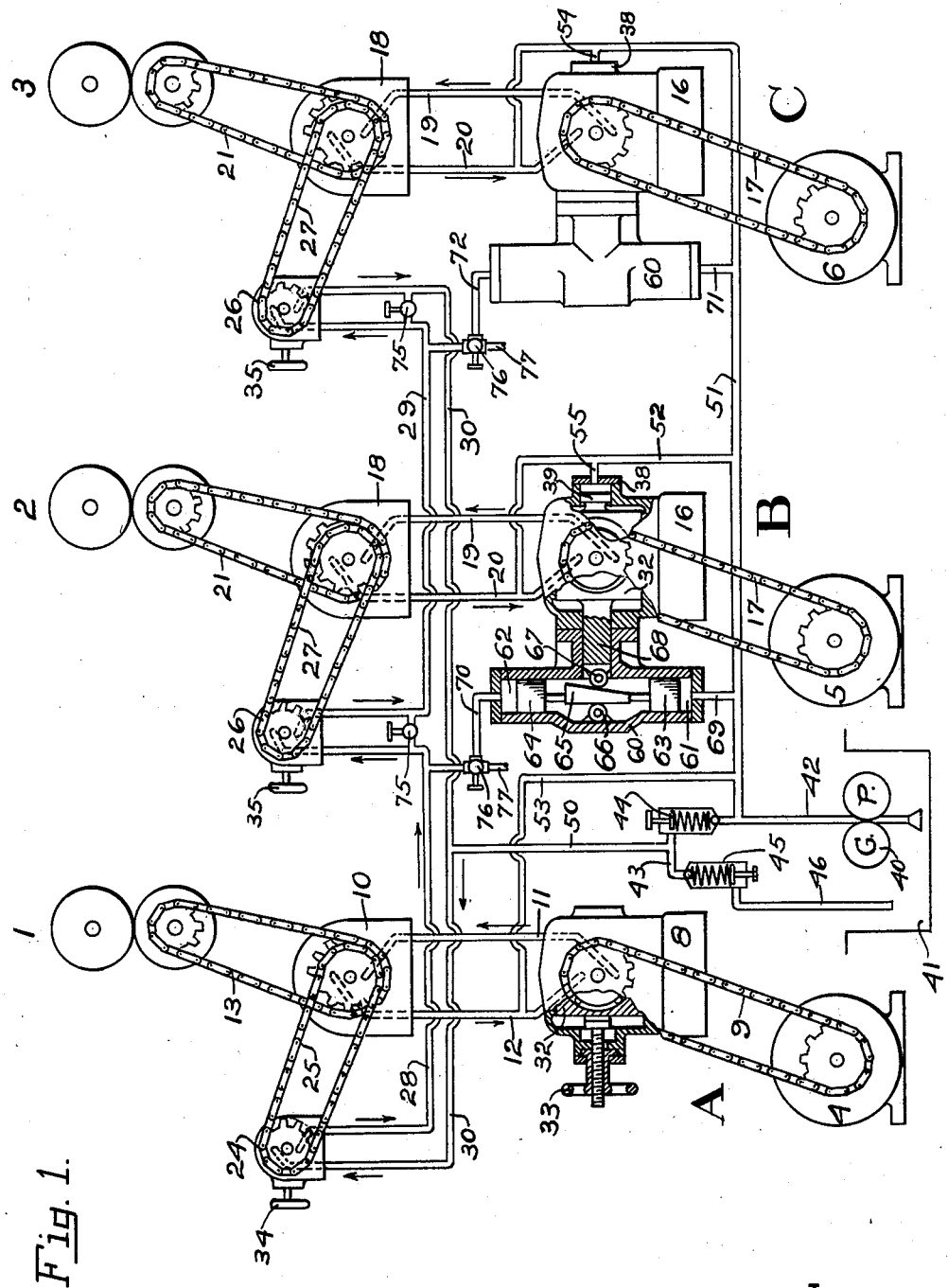
Fig. 1 is a diagram of a drive in which the ratio between the speeds of the several sections may be varied manually.

The drive has been shown in this figure as consisting of a leading or master section A and two follower sections B and C to drive, respectively, three related machines 1, 2, and 3. The follower sections are ordinarily identical except that they may vary in size as conditions require. If only two machines are to be driven, section C is omitted and the control pumps of sections A and B are connected in series. If more than three machines are to be driven, a follower section for each additional machine is added and the control pumps of all of the sections are connected in series with each other.

The several sections may be driven from a single prime mover, such as a line shaft, or they may be driven by separate prime movers for the reason that the drive will maintain the speeds of the driven machines proportional to each other irrespective of variations in the relative speeds of the several prime movers. As shown, sections A, B, and C are driven, respectively, by three electric motors 4, 5, and 6.

Section A includes a variable speed hydraulic transmission consisting primarily of a pump 8 which is mechanically connected by a drive 9 to electric motor 4 to be driven thereby, and a hydraulic motor 10 which is hydraulically connected by a pressure channel 11 and return channel 12 to pump 8 to be driven by liquid supplied therefrom and which is mechanically connected by a drive 13 to machine 1 to drive the same.

Each of sections B and C includes a variable speed hydraulic transmission consisting primarily of a pump 16, which is mechanically connected by a drive 17 to electric motor 5 or 6 to be driven thereby, and a hydraulic motor 18 which is hydraulically connected by a pressure channel 19 and a return channel 20 to pump 16 to be driven by liquid supplied therefrom and which is mechanically connected by a drive 21 to machine 2 or 3 to drive the same.

Each section of the drive is provided with a small capacity variable displacement control pump which is driven in any suitable manner by the hydraulic motor of that section, and all of the control pumps are connected in series with each other regardless of the number of sections. That is, the outlet of the control pump of each except the last section is connected to the inlet of the control pump in the next section and the outlet of the control pump in the last section is connected to the inlet of the control pump of the first section.

As shown, section A is provided with a control pump 24 which is mechanically connected to motor 10 by a drive 25 to be driven thereby in unison therewith, and sections B and C are each provided with a control pump 26 which is mechanically connected to motor 18 by a drive 27 to be driven thereby in unison therewith. These control pumps are connected in series by a channel 28 which connects the outlet of the section A control pump to the inlet of the section B control pump, a channel 29 which connects the outlet of the section B control pump to the inlet of the section C control pump, and a channel 30 which connects the outlet of the section C control pump to the inlet of the section A control pump.

In order to vary the speed of each machine relative to the prime mover from which it is driven, it is necessary to vary the relative displacements of the pump and motor of each transmission but it is immaterial whether the displacement of the pump or the displacement of the motor is varied as the speed of the machine may be increased by either increasing pump displacement or decreasing motor displacement and it may be decreased by decreasing pump displacement or increasing motor displacement. Also, a wider variation in speed may be obtained by varying the displacements of both the pump and the motor of each transmission inversely to each other.

For the purpose of illustration, each transmission has been shown as having a constant displacement motor and a variable displacement pump but it is to be understood that the invention is not limited to this particular arrangement and that either or both the pump and the motor may be variable.

The several pumps and motors may be of any suitable type such, for example, as the rolling piston type shown in Patent No. 2,074,068. In a hydrodynamic machine of this type, the rotor of the machine is arranged inside a slide block 32 having an annular inner surface against which the pistons react. The displacement of the machine is varied by shifting the slide block transverse to the axis of rotation of the rotor.

The displacement of pump 8 is ordinarily manually adjusted either locally or from a remote point through electromagnetic or hydraulic means in the well known manner. As shown, pump 8 is provided with a stroke changing mechanism of the type shown in Patent No. 1,998,984 which also discloses a hydrodynamic machine of the rolling piston type. This mechanism includes a hand wheel 33 rotation of which in one direction or the other will cause the slide block 32 of pump 8 to be shifted in one direction or the other and thereby change pump displacement. Control pumps 24 and 26 may be provided, respectively, with similar stroke adjusting hand wheels 34 and 35.

Pump 16 has its slide block 32 urged toward zero displacement position by a constant force reduced, for example, by liquid supplied at a constant pressure to a cylinder 38 which is carried by the pump casing and has a piston 39 fitted therein and engaging or connected to the slide block.

Each pump may be supercharged and the piston 39 of each pump may be operated by liquid supplied from an auxiliary gear pump driven in unison with that pump and arranged in the casing thereof according to the usual practice. For the purpose of illustration however, the drive is shown provided with a single gear pump 40 which supplies all liquid for supercharging and for control purposes and which may be driven independently of the other pumps or driven in unison with pump 8.

As shown, gear pump 40 draws liquid from a reservoir 41 and discharges it into a channel 42 which is connected to one end of a channel 43 through a relief valve 44. The other end of channel 43 is connected through a relief valve 45 to a drain channel 46 which discharges into reservoir 41. Gear pump 40 is ordinarily small but of sufficient capacity to at all times discharge liquid at a limited volumetric rate through relief valves 44 and 45 into reservoir 41, thereby maintaining in channel 43 a pressure equal to the resistance of relief valve 45 and maintaining in channel 42 a pressure equal to the combined resistances of relief valves 44 and 45.

Channel 43 is connected intermediate its ends to return channel 30 by a channel 50, thereby enabling gear pump 40 to make up for any leakage losses in control pumps 24 and 26 and to maintain in channel 30 a pressure equal to the resistance of relief valve 43.

Channel 42 has connected thereto one end of a channel 51 which has its other end connected to channel 20 of section C and which is connected intermediate its ends by a channel 52 to channel 20 of section B and by a channel 53 to channel 12 of section A. Channel 51 is connected by a channel 54 to the cylinder 38 of pump 16 in section C and channel 52 is connected by a channel 55 to the cylinder 38 of pump 16 in section B. If the drive were provided with a different number of follower sections, channel 51 would be similarly connected to the return channel 20 and the cylinder 38 of each follower section.

Gear pump 40 is thus enabled to supercharge all of the power pumps at a pressure equal to the combined resistances of relief valves 44 and 45, and to supply liquid at the same pressure to the cylinders 38 of all of the power pumps in the follower sections. The liquid supplied to the cylinder 38 of each pump 16 acts upon the piston 39 therein and tends to move it and the slide block 32 connected thereto in a direction to decrease the displacement of that pump.

The transmission of each follower section has the slide block 32 of its pump 16 urged in a direction to increase pump displacement by the pressure prevailing between the control pump of that section and the next control pump in the series. This pressure may act upon a stroke control piston connected direct to slide block 32, such as the stroke control piston shown in Fig. 5 of application Serial No. 74,740 filed April 16, 1936 by James K. Douglas (Oilgear case 530), but since a slight movement of slide block 32 causes a material variation in volumetric delivery, each pump 16 is shown provided with a hydraulic actuator 60 in order that a slight movement of the slide block will require a substantial movement of the stroke control piston.

Actuator 60 has its casing attached to the pump casing and provided in its opposite ends with two cylinders 61 and 62 having a common axis which lies at right angles to the direction of slide block movement. Two pistons 63 and 64 are fitted, respectively, in cylinders 61 and 62 and connected to each other by a wedge or cam 65 having its outer face parallel to the cylinder axis and in contact with a roller 66 carried by the actuator casing upon the inside thereof.

Cam 65 has its inner face inclined and in contact with a roller 67 carried by the outer end of an arm 68 which is guided in the casing of the actuator and has its inner end in contact with or fastened to slide block 32.

Actuator 60 of pump 16 in section B has its cylinder 61 connected to channel 51 by a channel 69 and its cylinder 62 connected to channel 28 by a channel 70. The actuator 60 of pump 16 in section C has its cylinder 61 connected to channel 51 by a channel 71 and its cylinder 62 connected to channel 29 by a channel 72. If a different number of drive sections were employed, the pump 16 of each section would be provided with an actuator 60 which would be similarly connected to the gear pump and control pump channels.

The liquid in cylinder 38 urges slide block 32 toward zero displacement position and holds roller 67 firmly against cam 65 which, as long as it remains stationary, keeps slide block 32 from moving toward zero displacement position and thereby maintains pump displacement constant. If cam 65 is moved upward, the liquid in cylinder 38 will move slide block 32 toward zero displacement position and, if the cam 65 is moved downward, it will force slide block 32 toward maximum displacement position against the resistance of the liquid in cylinder 38, the distance slide block 32 is shifted and the amount pump displacement is varied being proportional to the movement of cam 65.

In order that the drive may be employed to operate machines which require that certain sections thereof remain idle while other sections are operating, means are provided whereby any section except the leading section may be cut out. This is accomplished by providing a bypass valve 75 for bypassing each pump 26 and a three-way valve 76 for opening each cylinder 62 to a drain. Valves 75 and 76 are ordinarily motorized and operated from a control station but, for the purpose of illustration, they have been shown as hand operated valves.

A valve 75 is connected between the intake channel and the outlet channel of the pump 26 of each follower section and is closed when that section is in operation. A valve 76 is connected into the channel 70 of each follower section and to a drain channel 77 and is adjusted to close communication between cylinder 62 and drain channel 77 and to maintain communication between cylinder 62 and the control pump circuit when that section is in operation.

A section may be cut out or caused to remain idle by opening its valve 75 and turning its valve 76 to open cylinder 62 to drain channel 77 as this permits the liquid flowing in the control circuit to pass around pump 26 and gear pump liquid to enter cylinder 61 and raise piston 63, cam 65 and piston 64 and expel liquid from cylinder 62 into drain channel 77, thereby permitting gear pump liquid to enter cylinder 38 and move slide block 32 to zero displacement position so that pump 16 ceases to drive motor 18.

Assuming that motors 10 and 18 should operate at the same speed, that pumps 8, 16 and 40 were being driven and that drives 25 and 27 had the same ratio, control pumps 24 and 26 would be adjusted to have the same displacement and the mechanism would operate as follows:

As long as the loads on hydraulic motors 10 and 18 and the speeds of electric motors 4, 5 and 6 did not vary, the speeds of motors 10 and 18 and the speeds of control pumps 24 and 26 would remain unchanged but, if the load on the hydraulic motor or the speed of the electric motor in any section should vary, the speed of the control pump in that section would vary and cause the control mechanism to correct the variation in speed.

For example, if motor 10 should increase its speed due either to a decrease in the load thereon or to adjustment of pump 8, it would drive pump 24 faster and cause it to discharge more liquid than pump 26 of section B could receive at its current speed. This excess liquid would increase the pressure in channel 28, then flow through channel 70 to cylinder 62 and force piston 64 downward to increase the displacement of pump 16 so that the speed of motor 18 and the speed of pump 26 would be increased substantially simultaneously with the increase in the speed of motor 10. When the speed of motor 10 ceases to increase, the speed of motor 18 would also cease to increase for it would then be running at the same speed as motor 10.

As soon as pump 26 of section B started to increase its speed, it would discharge more liquid than the pump 26 of section C could receive at its current speed, thereby causing through actuator 60 and pump 16 a corresponding increase in the speed of motor 18 and pump 26 of section C substantially simultaneously with the increase in the speed of motor 18 and pump 26 of section B in the same manner that the speeds of motor 18 and pump 26 of section B were increased substantially simultaneously with the increase in the speeds of motor 10 and pump 24.

If motor 10 should decrease its speed due either to an increase in the load thereon or to adjustment of pump 8, it would drive pump 24 slower and cause it to discharge less liquid than pump 26 of section B would require at its current speed. This deficiency of liquid would decrease the pressure in channel 28, cause pump 26 to draw liquid from cylinder 62 and permit piston 63 to raise cam 65 to effect a reduction in the displacement of pump 16 so that the speed of motor 18 and the speed of pump 26 would be decreased substantially simultaneously with the decrease in the speed of motor 10. When the speed of motor 10 ceased to decrease, the speed of motor 18 would also cease to decrease for it would then be running at the same speed as motor 10.

As soon as pump 26 of section B started to decrease its speed, it would discharge less liquid than the pump 26 of section C would require at its current speed, thereby causing through actuator 60 and pump 16 a corresponding decrease in the speed of motor 18 and pump 26 of section C substantially simultaneously with the decrease in the speed of motor 18 and pump 26 of section B in the same manner that the speeds of motor 18 and pump 26 of section B were decreased simultaneously with the decrease in the speed of motor 10 and pump 24.

Likewise, if the drive should have more than three sections, the speed of the motor 18 and the pump 26 of each succeeding section would be varied in response to a variation in the speed of the pump 26 of the preceding section in the same manner that the speeds of motor 18 and pump 26 of each of sections B and C were varied in response to the variation in the speed of the control pump of the preceding section.

If motor 18 of section B should tend to run slower than motor 10, it would tend to drive control pump 26 slower than pump 24 was being driven so that pump 26 could not take all of the liquid discharged by pump 24. Any liquid discharged by pump 24 in excess of the liquid taken by pump 26 would operate actuator 60 which would cause an increase in the displacement of pump 16 to thereby increase the speeds of motor 18 and pump 26 to the initial speeds thereof.

If motor 18 of section B should tend to run faster than motor 10, it would drive control pump 26 faster than pump 24 was being driven so that pump 24 would not discharge liquid at a rate sufficient to supply pump 26, thereby causing actuator 60 to operate and decrease the displacement of pump 16 to cause the speeds of motor 18 and pump 26 to decrease to the initial speeds thereof.

If motor 18 of section C should run faster or slower than the motor 18 of section B, the increase in pressure and the excess of liquid or the decrease in pressure and the deficiency of liquid in channel 29 would cause actuator 60 of section C to be operated to effect adjustment of pump 16 of section C to correct the speed of motor 18 in the same manner that the speed of motor 18 of section B was corrected.

Likewise, if the drive were provided with more than three sections, the speed of the motor of each succeeding section would be maintained proportional to the speed of the motor of the preceding active section by adjustment of the power pump of that section in response to the volumetric input of the control pump of that section varying from the volumetric output of the control pump of the preceding active section.

In the foregoing explanation, it has been assumed that all of the control pumps have the same displacement so that all of the hydraulic motors would operate at the same speed, and it has been shown that the control pump of the master section controls the speeds of the motors in all of the follower sections.

The speed of the entire drive may be varied relative to the speeds of the prime movers by varying the displacement of pump 8 and thereby vary the speeds of motor 10 and control pump 24 for the reason that varying the speed of pump 24 will vary the volumetric output thereof as previously explained. Therefore, the speeds of all of the motors 18 may be varied relative to the speed of motor 10 by adjusting pump 24 to increase or decrease its displacement so that its volumetric output will be increased or decreased and cause the speeds of the motors of all of the follower sections to be increased or decreased in exactly the same manner that the speeds thereof are varied when the volumetric output of pump 24 is varied by variations in its speed as previously explained.

The speeds of the motors in the follower sections may also be varied by adjusting pumps 26 to vary the displacements thereof, or the speed of a particular follower section may be varied relative to the speed of other follower sections by simply adjusting the control pump in that particular section to vary the displacement thereof.

For example, if it is desired that the motor 18 of section B should run faster, pump 26 of that section may be adjusted to reduce its displacement so that at its current speed it cannot take all of the liquid discharged by pump 24. The liquid discharged by pump 24 in excess of the volumetric input of pump 26 will cause, in the previously described manner, pump 16 to accelerate motor 18 until it is driving pump 26 at a speed at which the volumetric output of pump 24 and the volumetric input of pump 26 are equal and then further adjustment ceases.

Conversely, if it is desired that the motor 18 of section B should run slower, pump 26 of that section may be adjusted to increase its displacement so that at its current speed it does not receive enough liquid from pump 24 and is obliged to draw some liquid from cylinder 62 thereby causing, in the previously described manner, pump 16 to decelerate motor 18 until it is driving pump 26 at a speed at which the volumetric output of pump 24 and the volumetric input of pump 26 are equal and then further adjustment ceases.

Adjustment of the speed of one follower section will not cause a corresponding variation in the speed of any succeeding section for the reason that the speed of the adjusted control pump is automatically varied inversely to and substantially simultaneously with the variation in the displacement thereof so that its volumetric output remains unchanged and, consequently, cannot cause any adjustment of the succeeding sections.

Each follower section is thus always under the control of the master section and the speed thereof is always proportional to the speed of the master section regardless of whether all of the sections are running at the same speed or at different speeds.

Figure 2:
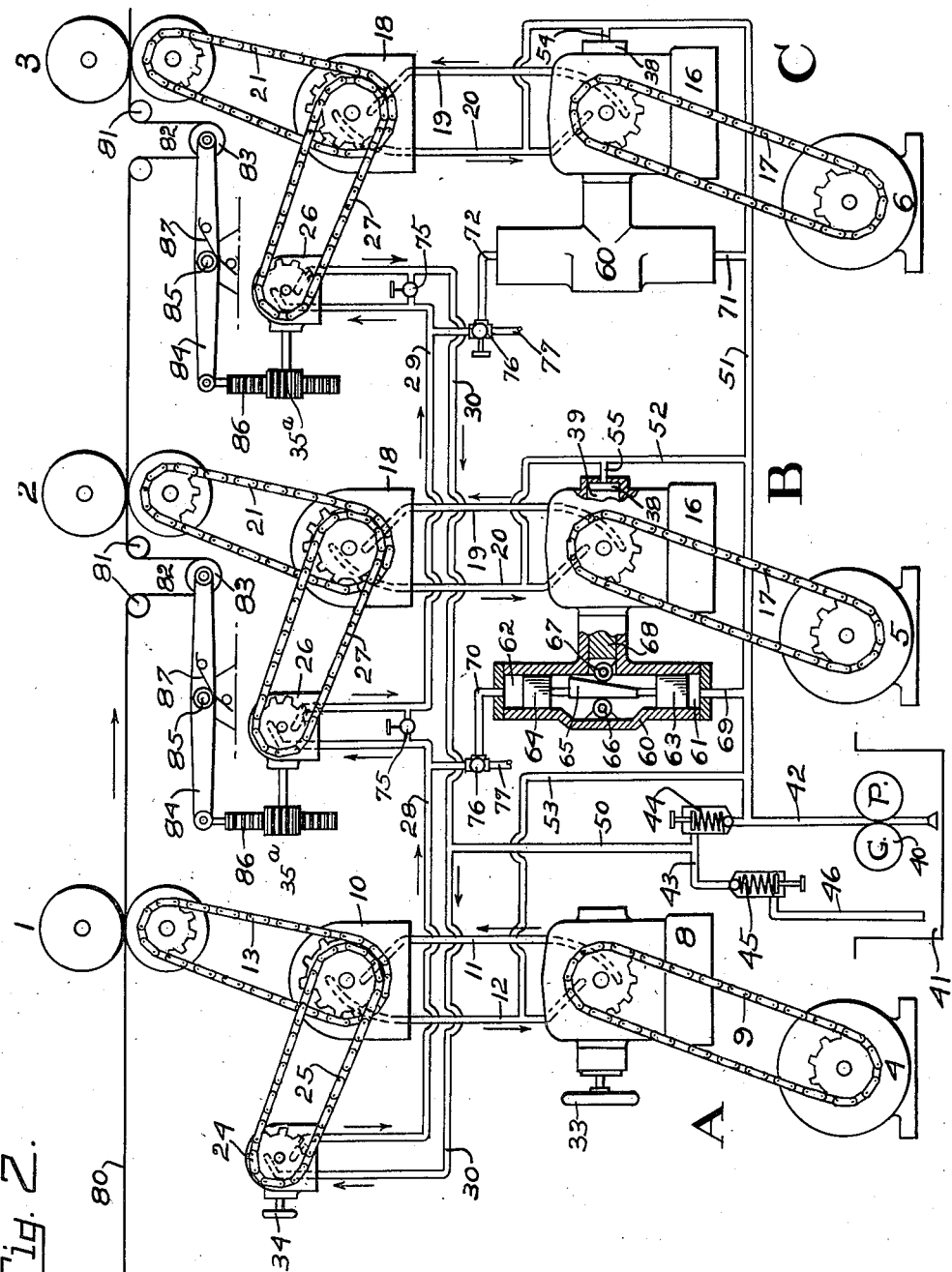
Fig. 2 is a similar diagram showing one method of automatically varying the ratio between the speeds of the several sections.

*Fig. 2*

The drive shown in this figure differs from the drive shown in Fig. 1 only in that the hand wheel 35 on the control pump of each follower section has been replaced by a gear 35ª in order that the displacement of pump 26 may be adjusted automatically instead of manually. Since the drive is otherwise the same as the drive shown in Fig. 1, like parts have been indicated by like reference numerals and no further description thereof will be given.

For the purpose of illustration, the drive has been shown as being connected to drive a machine having three units 1, 2 and 3 which are adapted to operate upon a web of material 80 but it is to be understood that the method shown for adjusting the control pump is simply illustrative and that in practice a machine of this character would have a greater number of units and that a drive section would be provided for each unit.

The machine is provided with a pair of spaced apart deflector rollers 81 between each two adjacent units. Web 80, in passing through the several units, passes over rollers 81 and has a loop 82 formed in it between the two rollers 81 of each pair.

Each loop 82 supports a float roller 83 which is connected at its axis to one end of a lever 84 pivoted intermediate its end upon a stationary pivot 85. The other end of each lever 84 is connected to one end of a rack 86 which meshes with a gear 35ª. If roller 83 is not heavy enough to provide the desired tension on web 80 or it is desired to adjust the tension thereon, lever 84 may be provided with a spring 87 to urge roller 83 downward.

The drive functions in the previously described manner to drive the several units of the machine and to maintain the speed of each follower section proportional to the speed of the master section.

If that part of the web between units 1 and 2 should increase in length for any reason, such as by stretching, the loop 82 between those two units would increase in length and lower the float roller 83 supported thereby. Float roller 83 would swing lever 84 on its pivot 85 and raise rack 86 which would rotate gear 35ª to decrease the displacement of control pump 26 in section B and thereby cause motor 18 to be accelerated in the previously described manner until loop 82 was reduced to its initial length.

If that part of the web between units 1 and 2 should decrease in length for any reason, such as by shrinking, the loop 82 between those two units would decrease in length and raise the float roller 83 supported thereby. Float roller 83 would swing lever 84 and lower rack 86 which would rotate gear 35ª to increase the displacement of the control pump 26 in section B and thereby cause motor 18 to be decelerated in the previously described manner until loop 82 was increased to its initial length.

Likewise, if that part of the web between other units (such as units 2 and 3) should vary in length, the loop 82 between those two units would vary in length and raise or lower float roller 83 to cause adjustment of the pump 26 in the following drive section (such as section C) to thereby vary the speed of the motor 18 of that section until loop 82 was reduced or increased to its initial length.

A drive of this character will automatically maintain the speeds of the several units proportional to each other regardless of variations in the loads on the individual drive sections and regardless of slight variations in the speeds of the individual prime movers as long as the web does not stretch or shrink, and it will automatically adjust the speed of any or all follower sections to compensate for stretching or shrinking of the web.

The invention herein set forth is susceptible of various modifications and adaptations without departing from the scope thereof as hereafter claimed.

The invention is hereby claimed as follows:

1. A hydraulic drive, comprising two hydraulic motors, a power pump for supplying motive liquid to each motor to drive the same, means for driving said pumps, a control pump driven in unison with each motor at a speed proportional to the speed thereof, fluid channels connecting said control pumps in series, and hydraulic means operated in response to the volumetric output of one control pump varying from the volumetric input of the other control pump for varying the displacement of one of said power pumps.

2. A hydraulic drive, comprising two hydraulic motors, a power pump for supplying motive liquid to each motor to drive the same, means for driving said pumps, a control pump driven in unison with each motor at a speed proportional to the speed thereof, fluid channels connecting said control pumps in series, hydraulic means operated in response to the volumetric output of one control pump varying from the volumetric input of the other control pump for varying the displacement of one of said power pumps, and means for varying the displacement of the other power pump to thereby vary the speeds of both of said motors.

3. A hydraulic drive, comprising two hydraulic motors, a power pump for supplying motive liquid to each motor to drive the same, means for driving said pumps, a control pump driven in unison with each motor at a speed proportional to the speed thereof, fluid channels connecting said control pumps in series, hydraulic means operated in response to the volumetric output of one control pump varying from the volumetric input of the other control pump for varying the displacement of one of said power pumps, and means for varying the displacement of at least one of said control pumps to thereby vary the speed of one motor relative to the speed of the other motor.

4. A hydraulic drive, comprising two hydraulic motors, a power pump for supplying motive liquid to each motor to drive the same, means for driving said pumps, a control pump driven in unison with each motor at a speed proportional to the speed thereof, fluid channels connecting said control pumps in series, hydraulic means operated in response to the volumetric output of one control pump varying from the volumetric input of the other control pump for varying the displacement of one of said power pumps, means for varying the displacement of the other power pump to thereby vary the speeds of both of said motors, and means for varying the displacement of at least one of said control pumps to thereby vary the speed of one motor relative to the speed of the other motor.

5. A drive for a series of related machine units, comprising a series of hydraulic transmissions each including a hydraulic motor for driving a unit and a power pump for supplying liquid to said motor to drive the same, one of said transmissions being adapted to function as a master and the others as followers, means for driving said pumps, a control pump driven in unison with each motor at a speed proportional to the speed thereof, fluid channels connecting said control pumps in series, and hydraulic means for varying the relative displacements of the pump and motor of each follower transmission in response to the volumetric input of the control pump associated with that transmission varying from the volumetric output of the preceding control pump in the series.

6. A drive for a series of related machine units, comprising a series of hydraulic transmissions each including a hydraulic motor for driving a unit and a power pump for supplying liquid to said motor to drive the same, one of said transmissions being adapted to function as a master and the others as followers, means for driving said pump, a control pump driven in unison with each motor at a speed proportional to the speed thereof, fluid channels connecting said control pumps in series, hydraulic means for varying the relative displacements of the pump and motor of each follower transmission in response to the volumetric input of the control pump associated with that transmission varying from the volumetric output of the preceding control pump in the series, and means for varying the relative displacements of the pump and motor of the master transmission to thereby vary the speeds of all of said motors.

7. A drive for a series of related machine units, comprising a series of hydraulic transmissions each including a hydraulic motor for driving a unit and a power pump for supplying liquid to said motor to drive the same, one of said transmissions being adapted to function as a master and the others as followers, means for driving said pumps, a control pump driven in unison with each motor at a speed proportional to the speed thereof, fluid channels connecting said control pumps in series, hydraulic means for varying the relative displacements of the pump and motor of each follower transmission in response to the volumetric input of the control pump associated with that transmission varying from the volumetric output of the preceding control pump in the series, and means for adjusting the displacement of each control pump to thereby vary the speeds of the motors of the transmissions following the transmission with which the adjusted control pump is associated.

8. A drive for a series of related machine units, comprising a series of hydraulic transmissions each including a hydraulic motor for driving a unit and a power pump for supplying liquid to said motor to drive the same, one of said transmissions being adapted to function as a master and the others as followers, means for driving said pumps, a control pump driven in unison with each motor at a speed proportional to the speed thereof, fluid channels connecting said control pumps in series, hydraulic means for varying the relative displacements of the pump and motor of each follower transmission in response to the volumetric input of the control pump associated with that transmission varying from the volumetric output of the preceding control pump in the series, means for varying the relative displacements of the pump and motor of the master transmission to thereby vary the speeds of all of said motors, and means for adjusting the displacement of each control pump to thereby vary the speeds of the motors of the transmissions following the transmission with which the adjusted control pump is associated.

9. A drive for a plurality of related machine units, comprising a hydraulic motor for driving each unit, a power pump for supplying motive liquid to each motor to drive the same, means for driving said pumps, a control pump mechanically connected to each motor to be driven in unison therewith by the power pump connected thereto, fluid channels connecting said control pumps in series, means for varying the displacement of one of said power pumps to thereby vary the speeds of the motor and the control pump driven thereby, and hydraulic means responsive to any variation between the relative volumes of liquid discharged by two adjacent control pumps in the series for varying the displacement of each of the other power pumps.

10. A drive for a plurality of related machine units, comprising a hydraulic motor for driving each unit, a power pump for supplying motive liquid to each motor to drive the same, means for driving said pumps, a control pump mechanically connected to each motor to be driven in unison therewith by the power pump connected thereto, fluid channels connecting said control pumps in series, means for varying the displacement of one of said power pumps to thereby vary the speeds of the motor and the control pump driven thereby, hydraulic means responsive to any variation between the relative volumes of liquid discharged by two adjacent control pumps in the series for varying the displacement of each of the other power pumps, and means for varying the displacement of at least one of said control pumps to thereby vary the speeds of the motors associated with the control pumps following that control pump in the series.

11. The combination, with a series of machine units having means for moving a substantially continuous web therethrough, of a drive for said units comprising a series of hydraulic transmissions each including a hydraulic motor for driving a unit and a power pump for supplying liquid to said motor to drive the same, one of said transmissions being adapted to function as a master and the others as followers, means for driving said pumps, a control pump driven in unison with each motor at a speed proportional to the speed thereof, fluid channels connecting said control pumps in series, hydraulic means for varying the relative displacements of the pump and motor of each follower transmission in response to the volumetric input of the control pump associated with that transmission varying from the volumetric output of the preceding control pump in the series, and means responsive to a variation in the length of the portion of said web between two adjacent units for adjusting the displacement of the control pump associated with one of said adjacent units to thereby compensate for said variation in web length.

12. The combination, with a series of machine units having means for moving a substantially continuous web therethrough, of a drive for said units comprising a series of hydraulic transmissions each including a hydraulic motor for driving a unit and a power pump for supplying liquid to said motor to drive the same, one of said transmissions being adapted to function as a master and the others as followers, means for driving said pumps, a control pump driven in unison with each motor at a speed proportional to the speed thereof, fluid channels connecting said control pumps in series, hydraulic means for varying the relative displacements of the pump and motor of each follower transmission in response to the volumetric input of the control pump associated with that transmission varying from the volumetric output of the preceding control pump in the series, and means responsive to a variation in the length of the portion of said web between a follower unit and the preceding unit for adjusting the displacement of the control pump associated with said follower unit to thereby compensate for said variation in web length.

13. The combination, with a series of machine units having means for moving a substantially continuous web therethrough, of a drive for said units comprising a series of hydraulic transmissions each including a hydraulic motor for driving a unit and a power pump for supplying liquid to said motor to drive the same, one of said transmissions being adapted to function as a master and the others as followers, means for driving said pumps, a control pump driven in unison with each motor at a speed proportional to the speed thereof, fluid channels connecting said control pumps in series, hydraulic means for varying the relative displacements of the pump and motor of each follower transmission in response to the volumetric input of the control pump associated with that transmission varying from the volumetric output of the preceding control pump in the series, means responsive to a variation in the length of the portion of said web between two adjacent units for adjusting the displacement of the control pump associated with one of said adjacent units to thereby compensate for said variation in web length, and means for varying the relative displacements of the pump and motor of the master transmission to thereby vary the speeds of all of said motors.

14. The combination, with a series of machine units having means for moving a substantially continuous web therethrough, of a drive for said units comprising a series of hydraulic transmissions each including a hydraulic motor for driving a unit and a power pump for supplying liquid to said motor to drive the same, one of said transmissions being adapted to function as a master and the others as followers, means for driving said pumps, a control pump driven in unison with each motor at a speed proportional to the speed thereof, fluid channels connecting said control pumps in series, hydraulic means for varying the relative displacements of the pump and motor of each follower transmission in response to the volumetric input of the control pump associated with that transmission varying from the volumetric output of the preceding control pump in the series, means responsive to a variation in the length of the portion of said web between a follower unit and the preceding unit for adjusting the displacement of the control pump associated with said follower unit to thereby compensate for said variation in web length, and means for varying the relative displacements of the pump and motor of the master transmission to thereby vary the speeds of all of said motors.

PAUL SIMONDS.